Figure 1:
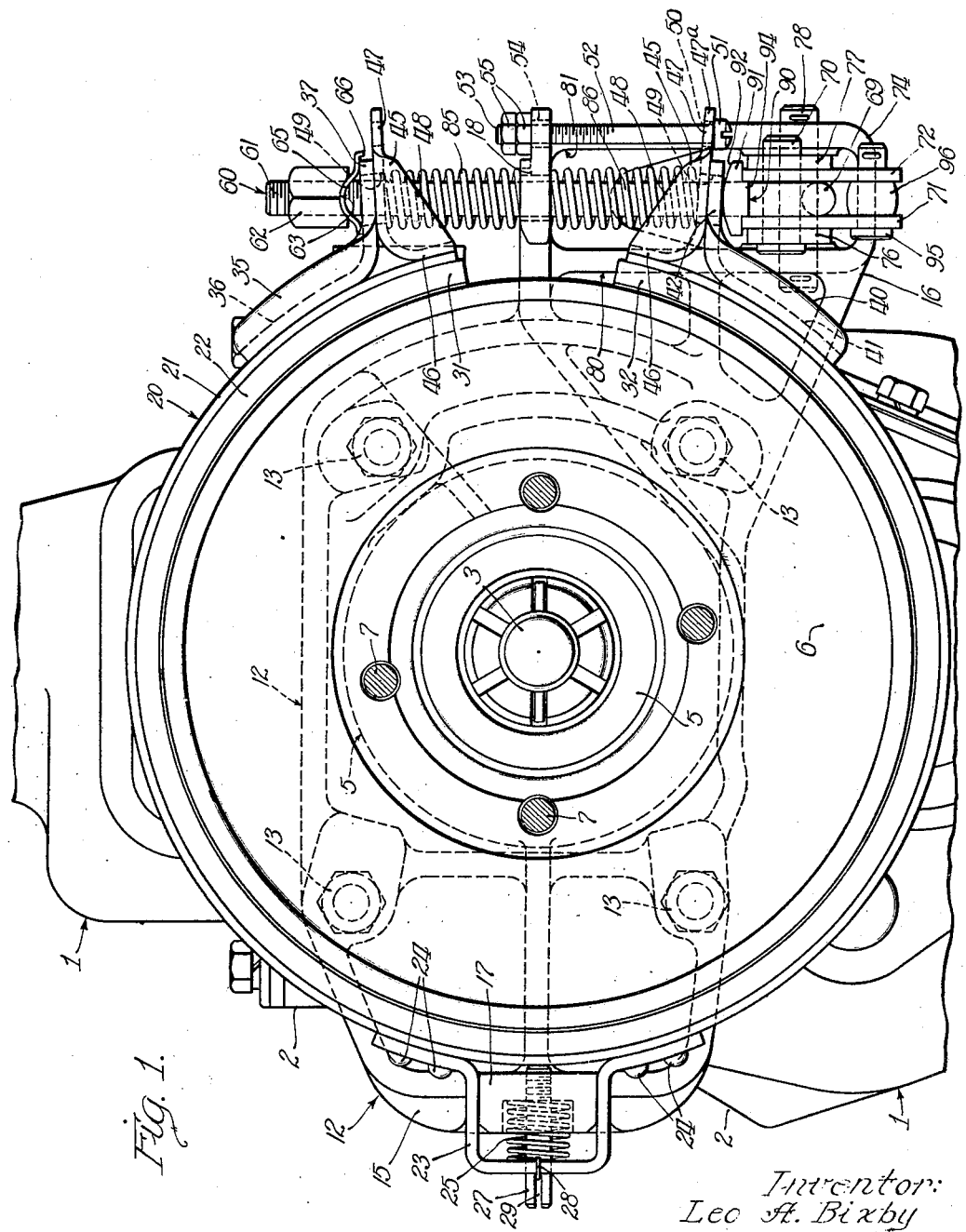

Aug. 17, 1937.   L. A. BIXBY   2,090,100
BRAKE CONSTRUCTION
Filed Aug. 2, 1935   2 Sheets-Sheet 1

Inventor:
Leo A. Bixby
By:
Attys.

Patented Aug. 17, 1937

2,090,100

UNITED STATES PATENT OFFICE 2,090,100

BRAKE CONSTRUCTION

Leo A. Bixby, Kalamazoo, Mich., assignor to Clark Equipment Company, Buchanan, Mich., a corporation of Michigan Application August 2, 1935, Serial No. 34,307

36 Claims. (Cl. 188—77)

The present invention relates generally to brakes, particularly those adapted for automotive vehicles and the like, and is especially concerned with brakes of the external contracting type arranged on the propeller shaft of automotive vehicles, usually in rear of the transmission.

Heretofore, brake drums have been mounted on the driven shaft of the transmission, or on the propeller shaft, and suitable braking means associated therewith for the purpose of providing an emergency or parking brake for the vehicle. Generally, the brake is of the external contracting type anchored to a suitable support and drawn around the brake drum in contact therewith by suitable mechanism reacting against clamping ears or lugs rigidly secured to the ends of the brake band. One form of construction which has proven generally satisfactory embodies bolt means anchored at one end to one brake band lug and carrying at its other end suitable cam means which when rocked, as by a hand lever or the like, reacts against the other brake band lug to tighten the brake band about the associated brake drum.

The principal object of the present invention is the provision of means associated with the brake drum and the operating mechanism and especially adapted to secure a uniform application of the brake at all times and in all positions of adjustment. Heretofore, due partly to the camming action, the brake band has tended to become distorted and displaced due to lack of proper accommodation between the parts of the operating mechanism during their movement with respect to each other when the brake is applied.

These and other objects and advantages of the present invention will be apparent to those skilled in the art after a consideration of the following detailed description of the preferred embodiment, taken in conjunction with the accompanying drawings forming a part of this specification.

Figure 2:
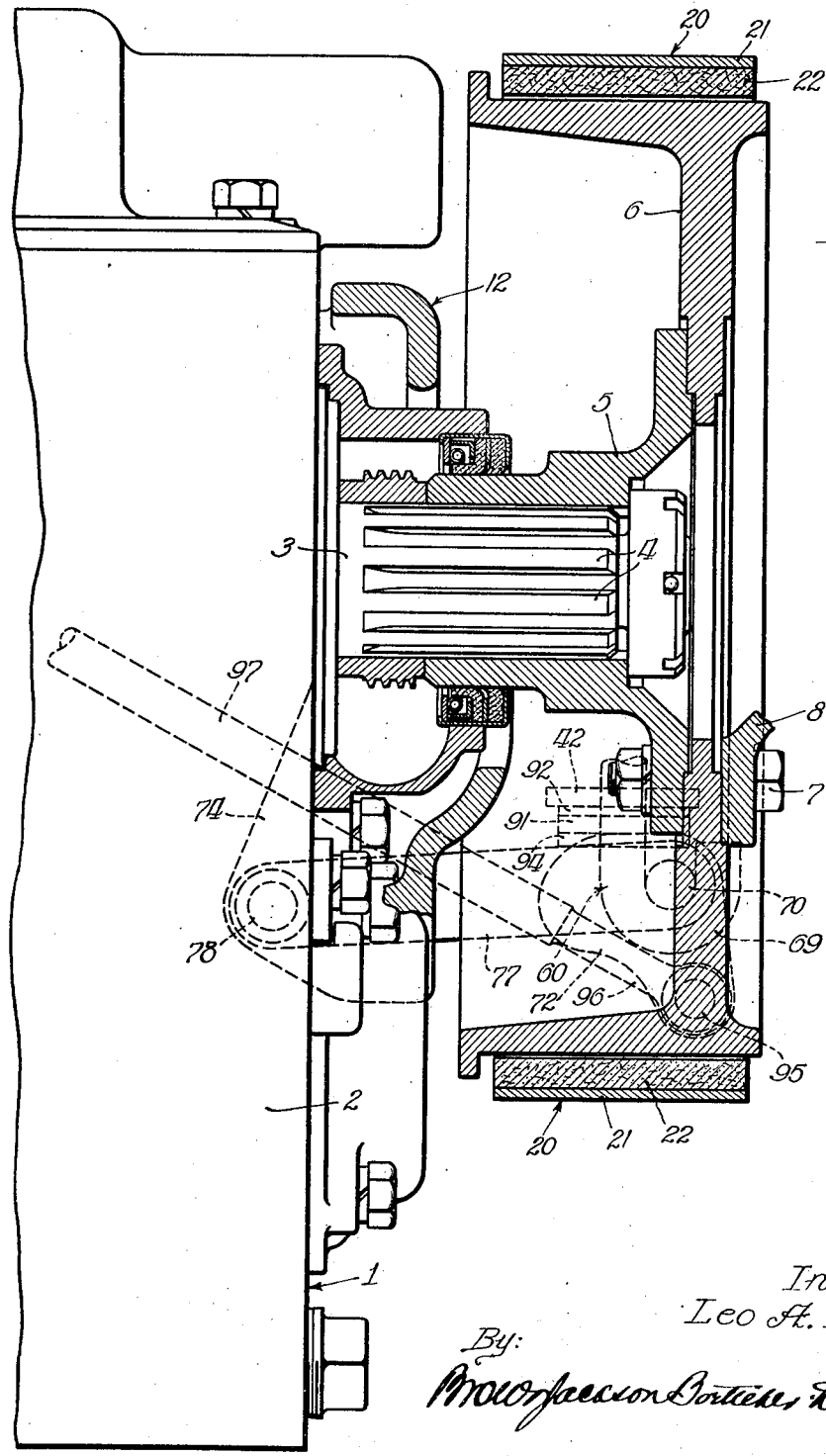

In the drawings:

Figure 1 is an end view looking forwardly of an automotive transmission equipped with a brake construction embodying the principles of the present invention; and Figure 2 is a side view of the construction shown in Figure 1, certain parts being shown in section.

Referring now to the drawings, the reference numeral 1 indicates an automotive selective gear transmission of more or less conventional construction, embodying a transmission housing 2 and suitable gearing therein (not shown) which serves to transmit the drive to a driven shaft 3. The rear end of the shaft 3 is splined, as indicated at 4, and receives a flanged collar 5 which serves as a support for the brake drum 6 secured thereto in any desired manner, as by bolt means 7. The bolt means 7 also serves to connect to the shaft 3 the flange 8 of the universal joint by which the power is transmitted to the propeller shaft of a vehicle.

A brake support in the form of a casting 12 is bolted to the rear end of the transmission housing 1, as by bolts 13 best shown in Figure 1, and the brake support 12 is formed with oppositely disposed generally laterally directed extensions 15 and 16, the former including a rearwardly extending anchoring lug 17 for the brake band and the latter including a similarly formed anchoring lug 18 for the brake operating mechanism. The brake band is indicated in its entirety by the reference numeral 20 and comprises a strap 21 and friction braking material 22. The intermediate portion of the brake band carries a U-shaped member 23 riveted to the strap 21, as at 24, and embracing the anchoring lug 17. Disposed between the intermediate portion of the strap member 23 and the lug 17 is a spring 25 which biases the brake band 20 for movement away from the brake drum 6. The movement of the brake band in this direction is limited by an adjusting screw 27 which is threaded into an opening formed in the anchoring lug 17 and held in adjusted position by any suitable means, such as a wire or key 28 disposed in a slot 29 formed in the adjusting screw 27 and embracing the U-shaped member 23.

The end portions of the brake band 20, indicated at 31 and 32, respectively, carry suitable clamping lugs by which the brake band may be contracted around the brake drum for the purpose of applying the brake. A clamping lug 35 is secured to the end 31 of the brake band 20 and, as best indicated in Figure 2, is in the form of a member including a base section 36 riveted or otherwise secured to the end of the brake band strap 21 and a generally radially directed extension 37 which is apertured. A similar clamping lug 40 is riveted or otherwise secured to the end 32 on the brake band and includes a base section 41 and an outwardly directed apertured extension 42.

Heretofore lugs of this same general form have been used for external contracting brake bands and it has been found there is a tendency for the brake applying force, to which the lugs 35 and 41 are subjected, to introduce distortions into the ends of the brake band and cause areas of excessive localized pressures at the heel of each lug where the extended section joins the base portion. According to the principles of the present invention, in order to provide an improved lug means and to secure reinforcement at this point so as to eliminate localized and highly stressed areas, auxiliary reinforcing lugs 45 are provided, as best shown in Figure 1.

Each of the auxiliary reinforcing lugs includes a base section 46 riveted or otherwise secured to the outer end of the brake band strap 21, an outwardly directed extension 47, and side wall portions 48 serving as integral webs joining the base and extended sections 46 and 47 together. Each of the auxiliary reinforcing lugs 45 is mounted on the brake band in opposed or back-to-back relation with respect to the associated clamping lug, the extended portions 37 and 42 of the latter being in firm contact with the extended portions 47 of the associated reinforcing lug members. Apertures 49 are formed in the sections 47 of the auxiliary lugs in axial alignment with the apertures in the sections 47 and 42 of the clamping lugs 34 and 40. At least one of the auxiliary reinforcing lugs is extended laterally beyond the end of the extended section of the associated clamping lug, as indicated at 47a, this latter portion being apertured, as at 50, to receive the head 51 of an adjusting bolt 52, the threaded end 53 of which is received by an aperture 54 formed in one portion of the anchoring lug 18, as best indicated in Figure 1. A pair of nuts 55 retain the bolt 52 in adjusted position, as will be referred to later.

The brake operating mechanism, by which the brake band 20 is contracted about the brake drum, includes a hook or J-bolt 60 disposed in the aligned apertures in the clamping and auxiliary reinforcing lugs. One end 61 of the bolt is threaded to receive an adjusting nut 62, one end of which is notched or grooved, as at 63, to cooperate with a humped washer or abutment member 65 carried by the upper clamping lug 35 and provided with a downturned tongue portion 66 which engages over the end of the extended lug portion 37 so that rotation of the member 65 on the bolt 60 is prevented.

The other end 69 of the bolt is formed with an eye or a hook to receive a pivot pin 70 on which two cam plates or bell crank members 71 and 72 are fulcrumed. To prevent fore and aft swinging, the pivot pin 70 is anchored to a laterally and downwardly directed extension 74 of the stationary brake support 12 by means of a pair of links 76 and 77, the links being pivotally connected to the portion 74 of the brake support 12 by means of a pivot pin 78 disposed in apertures in the portion 74, as best shown in Figure 1. The portion 74 of the brake support is joined with the laterally directed anchoring lug 18 by a pair of web sections 80 and 81, preferably formed integral with the other parts of the brake support. Cotter keys or the like are preferably employed for holding the pins 70 and 78 in place.

In order to move the brake 20 to its disengaged position, springs 85 and 86 are provided, the former being seated between the anchoring lug 18 on the brake support and the upper clamping lug 35 and the latter being disposed between the under side of the anchoring lug 18 and the lower clamping lug 40. The springs are tensioned to move the ends 31 and 32 of the brake band away from the stationary anchoring lug 18 and out of engagement with the outer surface of the brake drum 6. The springs 85 and 86 are preferably but not necessarily mounted around the bolt 60.

A member 90 in the form of a rocking shoe is carried by the two cam plates 71 and 72, and as best shown in Figure 1 the member 90 includes a head 91 having an upper surface 92 curved about an axis which is disposed substantially at right angles to the axes of the pins 70 and 78, the curved surface 92 being in direct contact with the extension 42 of the lower clamping lug 40. The cam shoe member 90 also has portions 94 which extend downwardly in between the cam plates 71 and 72 which, as best shown in Figure 1, are disposed on opposite sides of the bolt 60. The member 90 is provided with a central aperture to receive the bolt 60. The head 91 of the member 90 is formed to extend over the edges of the cam plates 71 and 72 so as to rest directly against them. Since the cam plates 71 and 72 are disposed against opposite sides of the hook end of the bolt 60 and are carried upon the pivot pin 70 supported by the bolt, the cam shoe member 90 is limited to sliding movement vertically on the shank of the bolt 60 whenever the cam members 71 and 72 are actuated. The lower portions of the cam plates 71 and 72 carry a pivot pin 95 (Figure 2) by which the apertured end 96 of an operating rod 97 is connected. The rod 97 may be actuated by any suitable means, such as a hand lever, and the arrangement of the pivots is such that when a pull is exerted on the link 97, to the left as viewed in Figure 2, the cam members 71 and 72 are rocked in a clockwise direction about their support on the pivot 70 to raise the cam shoe 90, causing the same to bear against the lower brake band lug 40. In raising the cam shoe 90, the cam plates 71 and 72 react through the pivot pin 70 directly against the links 76 and 77 and the lower end 69 of the bolt 60, which causes the later to exert a downward pull on the upper brake band lug 35 with a pressure which is substantially equal to the pressure with which the lower end of the brake band is moved upwardly, the springs 85 and 86 being compressed at this time and either the bolt 52 moving upwardly in the opening 54 or the extension 47 moving upwardly relative to the adjusting bolt 52, as best shown in Figure 1.

It will be noted that as the lugs 35 and 40 are forced together, the relatively small angular displacement of these parts relative to the bolt 60 is accommodated by the permissive rocking action which can take place between the adjusting nut 62 and the member 65 against which it reacts and by the curved surface 92 rocking with respect to the extension 42 of the lower clamping lug 40. By virtue of this latter construction, both of the cam plates 71 and 72 exert the same amount of force against the cam shoe 90 which, in turn, bears against the brake band lug without any tendency to distort or twist the same. The downward movement of the bolt 60, due to the cam plates 71 and 72 reacting against it, causes the anchoring links 76 and 77 to swing downwardly a small amount.

Wear of the friction brake lining can be compensated by adjusting the nuts 55 and 62 and the adjusting screw 27. The latter adjusts the clearance of the intermediate portion of the brake band, and the adjusting nuts 55 govern the position of the end 32 of the brake band. The adjusting nut 62, threaded onto the bolt 60, adjusts the position of the other end 31 of the brake band. It is to be noted that in making this adjustment the humped member 65 is held against rotation when the nut 62 is turned. The humped portion of the member 65 not only serves to accommodate the rocking motion between the end of the brake band and the bolt 60 but, in addition, serves to retain the adjusting nut 62 in any position of adjustment. The opening in the member 65 through which the bolt passes is enlarged to accommodate this rocking movement.

Heretofore, in constructions in which the cam plates 71 and 72 reacted directly against one of the brake band lugs both of the cam plates did not exert the same force, since the engaged portion of the brake band lug moved angularly with respect to the cam plates, as will be apparent from the relations illustrated in Figure 1. By providing the cam shoe member 90 and the curved surface, there is a firm contact between the member 90 and the brake band lug, and since the member 90 slides on the bolt 60 and by virtue of the line contact between the surface 92 and the member 42 of the brake band lug 40, each of the cam plates 71 and 72 exerts substantially the same force.

The clamping brake band lugs 35 and 40 are prevented from distorting or twisting the brake band itself by virtue of the auxiliary or reinforcing lugs 45, since by virtue of the latter, the reaction of the brake applying force exerted on the brake band is distributed over a comparatively wide area, which serves to prevent localized highly stressed areas.

While I have described above the preferred structure in which the principles of the present invention have been embodied, it is to be understood that my invention is not to be limited to the details shown and described, but that, in fact, widely different means may be employed in the practice of the broader aspects of my invention.

What I claim, therefore, and desire to secure by Letters Patent is:

1. In combination, a brake drum, an external brake band about said drum and having spaced ends, lug means reinforced on both sides in a circumferential direction and extending from each end of the brake band, and means including thrust transmitting means having relative rocking engagement with said reinforced lug means for drawing the latter toward each other to contract said brake band about said drum.

2. In combination, a brake drum, an external brake band about said drum and having spaced ends, lug means carried at each of said ends and extending generally radially outwardly thereof, one of said lug means having a substantially flat face, and means including thrust transmitting means having substantially line contact with the flat face of said one lug means extending in a direction generally parallel with respect to the axis of rotation of said brake drum for drawing both of the lug means toward each other to thereby contract said brake band about said drum.

3. In a brake construction, a brake band of the external contracting type, apertured lugs carried at the ends of said brake band, bolt means disposed in said apertures and extending therefrom at opposite ends, means anchoring one end of the bolt means to the associated brake band lug, a pair of rotatable cam members carried by the other end of said bolt means and disposed on opposite sides thereof, a member slidably mounted on said bolt means and constrained for movement longitudinally thereof, said member having a head portion engageable by both of said cam members and a curved surface adapted to engage the other of said brake band lugs, and means for rocking said cam members for contracting said brake band.

4. In a brake construction, a brake support, a brake band of the external contracting type anchored thereto and carrying at its ends apertured lugs, bolt means disposed at said apertures, a threaded member carried at one end of said bolt means and bearing against one of said brake band lugs, a pivot pin carried at the other end of said bolt means, a pair of cam plates mounted on said pivot means for rotation with respect to said bolt means, a cam shoe having an aperture therethrough to receive said bolt means and slidable longitudinally thereof, said cam shoe having an operating portion slidably carried upon both of said cam plates and a lug engaging surface curved generally about an axis disposed at right angles to said pivot axis and engageable with the other of said brake band lugs, swinging link means anchoring said pair of cam plates and said pivot pin to said brake support and arranged for pivotal movement about an axis parallel with respect to said first pivot axis, and an operating member pivotally connected with both of said cam plates for causing the same to bear against said cam shoe and to react against said bolt means for contracting said brake band.

5. In a brake construction, a brake support, a brake band of the external contracting type anchored to said support and apertured lugs carried at each end of said brake band, bolt means disposed in said apertures and extending at opposite ends therefrom, operating means reacting against one end of said bolt means and the associated brake band lug, the other end of said bolt means being threaded, a member separate from and held in non-rotatable relation with respect to said last named brake band lug and embracing the threaded end of said bolt means, and a threaded adjusting member carried by said bolt means and reacting against said separate member, said last two members being formed to provide for a limited amount of rocking of said bolt means with respect to said brake band lug with which said separate member is associated.

6. In a brake construction, a brake support, a brake band of the external contracting type anchored to said support and apertured lugs carried at each end of said brake band, bolt means disposed in said apertures and extending at opposite ends therefrom, operating means reacting against one end of said bolt means and the associated brake band lug, the other end of said bolt means being threaded, a member having a hump therein encircling the threaded end of said bolt means and having a downturned portion engaging over the end of the associated brake band lug to prevent the humped member from rotating with respect thereto, and a threaded adjusting nut carried by the threaded end of said bolt and having a notched portion adapted to receive and bear against the humped portion of said last named member.

7. In a brake construction, a brake support, a brake band of the external contracting type anchored to said support, clamping lugs connected to said brake band adjacent the ends thereof and having outwardly extending clamping ears, auxiliary reinforcing lugs connected with said clamping lugs, respectively, and the associated portions of the brake band, at least one of said auxiliary reinforcing lugs extending radially outwardly beyond the associated clamping ear, brake applying means connected with said clamping ears for contracting said brake band, and adjusting means therefor anchored to said brake support and operatively connected with the extended portion of said auxiliary reinforcing lug.

8. In a brake construction, a brake support, a brake band of the external contracting type anchored at its intermediate portion to one end of said support, apertured clamping lugs carried adjacent the ends of said brake band, reinforcing auxiliary lugs connected with said brake band adjacent said clamping lugs, one of said reinforcing lugs extending radially outwardly of the associated clamping lug and having an apertured portion, an anchoring lug carried by said brake support opposite said first mentioned end and having an aperture therein, bolt means disposed in said last named aperture and the apertures of said clamping lugs, means anchoring one end of said bolt means to one of said clamping lugs, brake operating means connected between the other end of said bolt means and the other clamping lug, and brake adjusting means including a member disposed in the apertured portion of said reinforcing lug and adjustably connected with the anchoring lug carried by said brake support.

9. In a brake construction, a brake band of the external contracting type, a clamping lug rigidly secured to said band at each end thereof, each of said lugs including an outwardly disposed section, and an auxiliary reinforcing lug secured to said brake band in opposed back-to-back relation with respect to each of said clamping lugs, each of said auxiliary lugs including an extended section in engagement with the extended section of said clamping lug and a base portion secured to the brake band.

10. In a brake construction, a brake band of the external contracting type, a clamping lug rigidly secured to said band at each end thereof, each of said lugs including an apertured bolt receiving section extending generally radially outwardly, and an auxiliary reinforcing lug associated with each of said clamping lugs, each of said auxiliary reinforcing lugs consisting of a base portion rigidly secured to the brake and an extended portion disposed in contact with the apertured bolt receiving section of the clamping lug, said auxiliary section having an aperture in alignment with the aperture of the associated clamping lug and connected with said base section by means serving as an integral reinforcing web.

11. In a brake construction, the combination of a brake band, anchoring means therefor, lugs carried at the ends of said brake band, bolt means anchored at one end to one of said lugs, cam means carried at the other end of said bolt means, a member operatively engaged by said cam means and carried by said bolt means for longitudinal movement with respect thereto, said member having a curved surface engageable with the other of said brake band lugs with a rocking motion relative thereto, and means operatively connected with said cam means for causing the latter to react against said bolt means and said member for contracting said brake band.

12. In a brake construction, a brake band having a pair of apertured lugs, bolt means disposed in the apertures of said lugs and projecting at opposite ends therefrom, means anchoring one end of the bolt means to one of said lugs for limited rocking movement with respect thereto in the general plane of the brake band, a transverse pivot carried by the other end of said bolt means, a pair of cam plates pivotally mounted on opposite sides of said bolt means on said pivot, and a member slidable on said bolt means and carried by both of said cam plates, said member having a surface engageable with the other of said brake band lugs for rocking movement with respect thereto also in the plane of said brake band.

13. In a brake construction, in combination, a brake drum, an external brake band disposed about said drum and having spaced ends, lug means carried at each of said ends and extending outwardly of the brake band, and means including thrust transmitting means having rocking engagement with one of said lug means and substantially line contact with the other lug means, said line contact and the axis of the aforesaid rocking movement being disposed at right angles to the plane of rotation of said brake drum, for drawing the lug means toward each other to contract the brake about said drum.

14. In a brake construction, in combination, a brake drum, an external brake band about said drum and having spaced ends, lug means carried at each of said ends and extending generally outwardly thereof, a pair of laterally spaced rockable cam members anchored to one of said lug means, a thrust member carried by said spaced cams and movable by the conjoint operation of the latter, and means on said thrust member disposed in a plane between said spaced cams and arranged to engage and transmit the thrust to said other lug means for contracting the brake band about said drum.

15. In a brake construction, a brake band, a clamping lug secured to each end of said brake band and having a generally radially outwardly extending apertured bolt receiving section, an auxiliary reinforcing lug associated with each of said clamping lugs and each including a base portion secured to the brake band and a generally radially outwardly extending section disposed in back-to-back relation and in contact with the bolt receiving section of the associated clamping lug, said extended section of each auxiliary lug having an aperture therein disposed in alignment with the aperture of the associated bolt receiving section, the radial portion of one of said auxiliary lugs extending outwardly beyond the end of the associated bolt receiving section and having an aperture therein outwardly of said section to receive brake adjusting means.

16. In combination, a brake drum, an external brake band about said drum and having spaced ends, lug means at each of said ends and extending outwardly thereof, means including thrust transmitting means having relative rocking engagement with both of said lug means, each about an axis transverse to the plane of said brake drum, for drawing the ends of the latter toward each other to contract said brake band about said drum, and means for relieving the brake band of the reaction of said thrust transmitting means in contracting the brake band about said drum.

17. In a brake construction, a brake band of the external contracting type, apertured lugs carried at the ends of said brake band, bolt means disposed in said apertures and extending therefrom at opposite ends, means anchoring one end of the bolt means to the associated lug including a member having an approximately cylindrical curvature that is arcuate about an axis disposed at right angles to the plane of the brake band, whereby said bolt means can move angularly with respect to the end of the brake band in applying and accommodating the release thereof without distorting the brake band, and means connecting the other end of said bolt means with the other brake band lug including a second member curved about an axis parallel with respect to said first axis, whereby the other end of said brake band can move angularly with respect to said bolt means in the application and release of said brake band.

18. In a brake construction, a reversible brake band of the external contracting type having a clamping lug rigidly secured to said band at each end thereof, each of said lugs including an outwardly disposed section, and an auxiliary reenforcing lug disposed against the outwardly extending section of the associated clamping lug and bearing against the associated outer end of the brake band, the lugs at one end of the brake band being similar to the lugs at the other, whereby said brake band is reversible.

19. In a brake construction, a reversible brake band of the external contracting type having a clamping lug rigidly secured to said band at each end thereof, each of said lugs including an outwardly disposed section, and an auxiliary reenforcing lug disposed against the outwardly extending section of the associated clamping lug and bearing against the associated outer end of the brake band, the lugs at one end of the brake band being similar to the lugs at the other, whereby said brake band is reversible, one of the lugs at each end of the brake band being extended outwardly farther than the companion lug and apertured to receive adjusting mechanism.

20. In a brake construction, a brake band of the external contracting type carrying apertured lugs at its ends, bolt means disposed at said apertures, a threaded member carried at one end of said bolt means and bearing against one of said brake band lugs, a pivot pin carried at the other end of said bolt means, a pair of cam plates mounted on said pivot means for rotation with respect to said bolt means, a cam shoe having an aperture therethrough to receive said bolt means and slidable longitudinally thereof, said cam shoe having an operating portion slidably carried upon both of said cam plates and a lug engaging surface curved generally about an axis disposed at right angles to said pivot axis and engageable with the other of said brake band lugs, and an operating member pivotally connected with both of said cam plates for causing the same to bear against said cam shoe and to react against said bolt means for contracting said brake band.

21. In a brake construction, a brake band of the external contracting type having clamping lugs adjacent the ends thereof, auxiliary reenforcing lugs connected with said clamping lugs, respectively, and the associated portions of the brake band, at least one of said auxiliary reenforcing lugs extending radially outwardly beyond the associated clamping lug, brake applying means connected with said clamping lugs for contracting said brake band, and adjusting means therefor operatively connected with the extended portion of said auxiliary reenforcing lug.

22. In a brake construction, a brake band of the external contracting type, apertured lugs carried at the ends of said brake band, bolt means disposed in said apertures and extending therefrom at opposite ends, means anchoring one end of the bolt means to the associated brake band lug, cam means carried by the other end of said bolt means, a member slidably mounted on said bolt means and constrained for movement longitudinally thereof, said member having a head portion engageable by said cam means and a cylindrical curved surface adapted to engage the other of said brake band lugs, and means for rocking said cam means for contracting said brake band.

23. In a brake construction, the combination of a brake band, lug means at each end of said band, means for shifting said lug means relative to one another, and means for connecting said lug shifting means with said lug means and including a connection with each of said lug means that is constrained for rocking engagement with said lug means about generally parallel axes that are disposed substantially perpendicular to the plane of the brake band.

24. In combination, a brake band, a flanged lug at each end of said band, means fastening the lug to the band disposed in between said flanges, and an auxiliary backing lug for each of said lug means, each of said backing lugs including a flanged part fastened to the end of the brake band in opposed relation with respect to the associated lug means.

25. In combination, a brake drum, an external brake band about said drum and having spaced ends, lug means extending from each end of the brake band, reinforcing lugs separate from said lug means and secured thereto and to said band adjacent the ends thereof, and means including thrust transmitting means having relative rocking engagement with said lug means and acting thereagainst in the direction of said reinforcing lugs for drawing the ends of the brake band toward each other to contract said brake band about said drum.

26. In a brake construction, the combination of a brake band, a lug fastened to the band adjacent each end thereof but spaced from the associated end by a relatively small amount, and a second lug carried at each end of said brake band in the space between said first lug and the end of the band and disposed in engagement with and serving to reenforce said first lug.

27. In combination, a brake drum, an external brake band about said drum and having spaced ends, lug means reinforced on both sides in a circumferential direction and extending from one end of the brake band, and means including thrust transmitting means having relative rocking engagement with said reinforced lug means and connected with the other end of said brake band for drawing the ends of the latter toward one another to contract said brake band about said drum.

28. In a brake construction, a brake band of the external contracting type carrying apertured lugs at its ends, bolt means disposed in said apertures and connected at one end to react against one of said brake band lugs, a pivot pin carried at the other end of said bolt means, a pair of cam plates mounted on said pivot means for rotation with respect to said bolt means, a cam shoe having an aperture therethrough to receive said bolt means and slidable longitudinally thereof, said cam shoe having an operating portion slidably carried upon both of said cam plates and a lug engaging surface curved generally about an axis disposed at right angles to said pivot axis and engageable with the other of said brake band lugs, swinging link means anchoring said pair of cam plates and said pivot pin against displacement relative to the plane of said brake band, and an operating member pivotally connected with both of said cam plates for causing the same to bear against said cam shoe and to react against said bolt means for contracting said brake band.

29. In a brake construction adapted for mounting adjacent a transmission, a brake band of the external contracting type, means anchoring the band to said transmission, apertured lugs carried at the ends of said brake band, bolt means disposed in said apertures and connected at one end to react against one of said brake band lugs, a pivot pin carried at the other end of said bolt means, a pair of cam plates mounted on said pivot means for rotation with respect to said bolt means, a cam shoe having an aperture therethrough to receive said bolt means and slidable longitudinally thereof, said cam shoe having an operating portion slidably carried upon both of said cam plates and a lug engaging surface curved generally about an axis disposed at right angles to said pivot axis and engageable with the other of said brake band lugs, swinging link means operatively connected at one end with said cam plates and at the other end with said transmission, and an operating member pivotally connected with both of said cam plates for causing the same to bear against said cam shoe and to react against said bolt means for contracting said brake band.

30. In a brake construction, a brake band of the external contracting type anchored at its intermediate portion against rotation, apertured clamping lugs carried adjacent the ends of said brake band, one of said lugs extending radially outwardly and having an apertured portion, an anchoring member disposed between the ends of said brake band and having an aperture therein, bolt means disposed in the first named apertures of said clamping lugs, means connecting one end of said bolt means to one of said clamping lugs, brake operating means connected between the other end of said bolt means and the other clamping lug, and brake adjusting means including a member disposed in the outer apertured portion of said one lug and adjustably connected with and disposed in the aperture in said anchoring member.

31. In a brake construction, a brake band of the external contracting type anchored at its intermediate portion against rotation, apertured clamping lugs carried adjacent the ends of said brake band, one of said lugs extending radially outwardly and having an apertured portion, an anchoring member disposed between the ends of said brake band and having an aperture therein, bolt means disposed in the aperture in said anchoring member and in the apertures of said clamping lugs, means connecting one end of said bolt means to one of said clamping lugs, brake operating means connected between the other end of said bolt means and the other clamping lug, and brake adjusting means including a member disposed in the outer apertured portion of said one lug and adjustably connected with said anchoring member.

32. In combination, a brake drum, an external brake band about said drum and having spaced ends, lug means extending from each end of the brake band, means engaging each of the lugs on the brake band for drawing the ends of the latter toward one another to contract said brake band about said drum, adjusting means anchored at one end and connected with one of said lugs, and means on each of said lugs adapted to receive said adjusting means.

33. In combination, a brake drum, an external brake band about said drum and having spaced ends, lug means extending from each end of the brake band, an anchoring member, means engaging each of the lugs on the brake band for drawing the ends of the latter toward one another to contract said brake band about said drum, and adjusting means connected with said anchoring means and with one of said lugs for determining the released position of said brake band.

34. In combination, a brake drum, an external brake band about said drum and having spaced ends, lug means extending from each end of the brake band, means engaging each of the lugs on the brake band for drawing the ends of the latter toward one another to contract said brake band about said drum, an anchoring member, each of said lugs and said anchoring member having alined openings to receive brake adjusting means, and brake adjusting means carried in the openings in said anchoring member and one of said lugs.

35. Brake actuating means for an external band brake, comprising a pair of spaced cams, means establishing a line contact with one end of said brake band in a plane between said cams, means transmitting the reaction of said cams to the other end of said brake band, and means for operating said cams.

36. In combination, a brake drum, an external brake band about said drum, brake actuating means therefor comprising a pair of spaced cams, means establishing a line contact with one end of said brake band in a plane between said cams, a member transmitting the reaction of said cams to the other end of said brake band, means for operating said cams, an anchor receiving said member, and adjusting means between one end of said brake band and said anchor.

LEO A. BIXBY.

CERTIFICATE OF CORRECTION.

Patent No. 2,090,100.                                             August 17, 1937.

LEO A. BIXBY.

It is hereby certified that error appears in the printed specification of the above numbered patent requiring correction as follows: Page 5, first column, line 12, claim 17, strike out "curved" and insert instead the words having an approximately cylindrical curvature that is arcuate; and that the said Letters Patent should be read with this correction therein that the same may conform to the record of the case in the Patent Office.

Signed and sealed this 19th day of October, A. D. 1937.

Henry Van Arsdale.
Acting Commissioner of Patents.

(Seal)